United States Patent
Koeda

(10) Patent No.: US 11,831,200 B2
(45) Date of Patent: Nov. 28, 2023

(54) AXIAL GAP MOTOR

(71) Applicant: SEIKO EPSON CORPORATION, Tokyo (JP)

(72) Inventor: Hiroshi Koeda, Suwa (JP)

(73) Assignee: SEIKO EPSON CORPORATION, Tokyo (JP)

( * ) Notice: Subject to any disclaimer, the term of this patent is extended or adjusted under 35 U.S.C. 154(b) by 45 days.

(21) Appl. No.: 17/184,631

(22) Filed: Feb. 25, 2021

(65) Prior Publication Data

US 2021/0273501 A1 Sep. 2, 2021

(30) Foreign Application Priority Data

Feb. 27, 2020 (JP) ................................ 2020-031346

(51) Int. Cl.
| | |
|---|---|
| *H02K 1/27* | (2022.01) |
| *H02K 5/24* | (2006.01) |
| *H02K 1/18* | (2006.01) |
| *H02K 1/28* | (2006.01) |
| *H02K 1/2796* | (2022.01) |

(52) U.S. Cl.
CPC ........... *H02K 1/182* (2013.01); *H02K 1/2796* (2022.01); *H02K 1/28* (2013.01)

(58) Field of Classification Search
CPC .. H02K 1/2793; H02K 1/2795; H02K 1/2796; H02K 1/2798; H02K 1/28; H02K 21/026; H02K 16/04; H02K 1/274; H02K 1/278; H02K 15/03; H02K 15/028; H02K 5/00; H02K 5/24
See application file for complete search history.

(56) References Cited

U.S. PATENT DOCUMENTS

| | | | | |
|---|---|---|---|---|
| 6,046,518 A | * | 4/2000 | Williams | ............. H02K 5/1737 310/43 |
| 2006/0113856 A1 | * | 6/2006 | Tanno | ..................... H02K 21/24 310/268 |
| 2009/0295246 A1 | | 12/2009 | Abe | |

(Continued)

FOREIGN PATENT DOCUMENTS

| | | |
|---|---|---|
| CN | 109845070 A | 6/2019 |
| JP | 2007330048 A | 12/2007 |

(Continued)

OTHER PUBLICATIONS

Machine Translation of WO 2018219859 A1 (Year: 2018).*

(Continued)

*Primary Examiner* — Tran N Nguyen
(74) *Attorney, Agent, or Firm* — Gang Yu

(57) ABSTRACT

An axial gap motor includes a rotor configured to rotate around a rotation axis and a stator disposed to be opposed to the rotor across a gap in an axial direction parallel to the rotation axis. The rotor includes a hub, an annular rim located on the outer side of the hub and holding a permanent magnet, a coupling section coupling the hub and the rim and including a recess having a first opening opened on a surface facing one end side in the axial direction, a first plate member disposed on the one end side of the coupling section and covering at least a part of the first opening in plan view from the axial direction, and a member disposed in the recess and having density lower than the density of the coupling section.

8 Claims, 7 Drawing Sheets

(56) References Cited

U.S. PATENT DOCUMENTS

| | | | |
|---|---|---|---|
| 2015/0054360 A1* | 2/2015 | Tanaka | B21D 39/00 |
| | | | 156/196 |
| 2019/0044401 A1* | 2/2019 | Sasaki | H02K 16/04 |
| 2019/0280575 A1* | 9/2019 | Inomoto | H02K 21/24 |
| 2019/0288588 A1* | 9/2019 | Sato | H02K 1/32 |

FOREIGN PATENT DOCUMENTS

| | | | | | |
|---|---|---|---|---|---|
| JP | 2008295212 A | | 12/2008 | | |
| JP | 2009296701 A | | 12/2009 | | |
| JP | 2013031242 A | * | 2/2013 | | |
| JP | 2013053232 A | | 3/2013 | | |
| JP | 2015033287 A | | 2/2015 | | |
| JP | 2015097436 A | * | 5/2015 | | H02K 1/28 |
| JP | 2017103836 A | | 6/2017 | | |
| WO | WO-2018219859 A1 | * | 12/2018 | | |

OTHER PUBLICATIONS

Machine Translation of JP 2013031242 A (Year: 2013).*
Search Report of the First Office Action CN Application No. 2021102115688 dated Apr. 25, 2023.

* cited by examiner

AXIAL GAP MOTOR

The present application is based on, and claims priority from JP Application Serial Number 2020-031346, filed Feb. 27, 2020, the disclosure of which is hereby incorporated by reference herein in its entirety.

BACKGROUND

1. Technical Field

The present disclosure relates to an axial gap motor.

2. Related Art

An axial gap motor described in JP-A-2009-296701 (Patent Literature 1) includes a rotor that rotates around a rotation axis and a pair of stators disposed to be opposed to sandwich the rotor from both sides in the thickness direction of the rotor. The rotor includes a rotor support and a magnet. The rotor support includes an annular rim section and a shaft section, a magnet sandwiched by the rim section and the shaft section, and an annular plate-like coupling section extending from the shaft section to the rotation axis side.

In such an axial gap motor, it is expected that responsiveness during acceleration and deceleration is further improved. It is necessary to achieve a reduction in weight in order to improve the responsiveness during the acceleration and deceleration. As one means for achieving the reduction in weight, there is a method of thinning down the coupling section. However, the rigidity of the coupling section decreases when the coupling section is thinned down. Therefore, for example, it is conceivable to provide a plate member for reinforcement in the coupling section in order to increase the rigidity of the coupling section reduced by the thinning-down.

However, when such a plate member is provided, the plate member bends and vibrates with vibration caused by the rotation of the rotor and a magnetic force generated from the magnet. As a result, vibration, noise, and the like involved in the vibration of the plate member occur.

SUMMARY

An axial gap motor according to an application example of the present disclosure includes: a rotor configured to rotate around a rotation axis; and a stator disposed to be opposed to the rotor across a gap in an axial direction parallel to the rotation axis. The rotor includes: a hub; an annular rim located on an outer side of the hub and holding a permanent magnet; a coupling section coupling the hub and the rim and including a recess having a first opening opened on a surface facing one end side in the axial direction; a first plate member disposed on the one end side of the coupling section and covering at least a part of the first opening in plan view from the axial direction; and a member disposed in the recess and having density lower than density of the coupling section.

DESCRIPTION OF EXEMPLARY EMBODIMENTS

An axial gap motor according to the present disclosure is explained in detail below based on embodiments shown in the accompanying drawings.

First Embodiment

Figure 1:
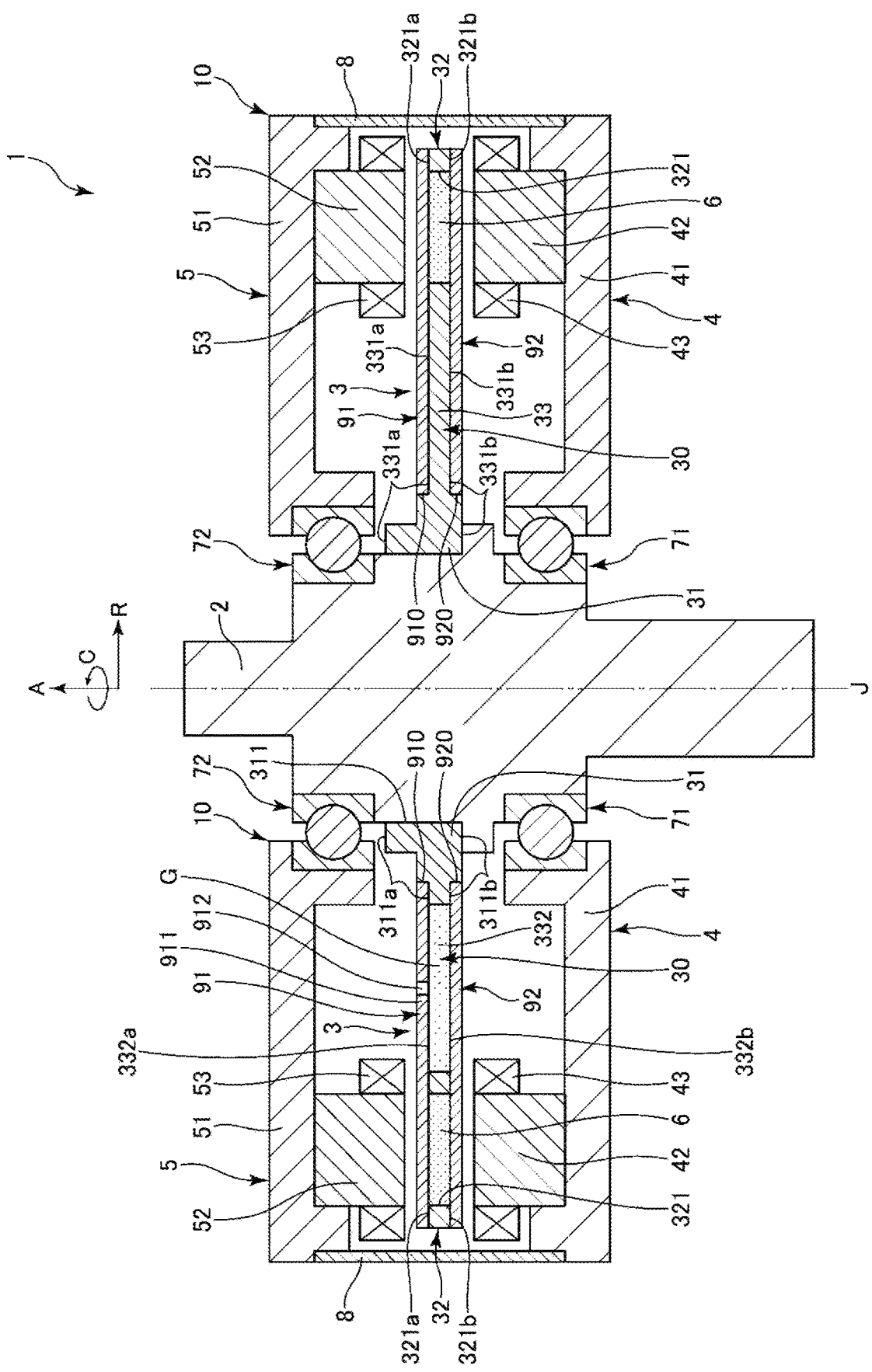
FIG. 1 is a longitudinal sectional view showing an axial gap motor according to a first embodiment.
Figure 2:
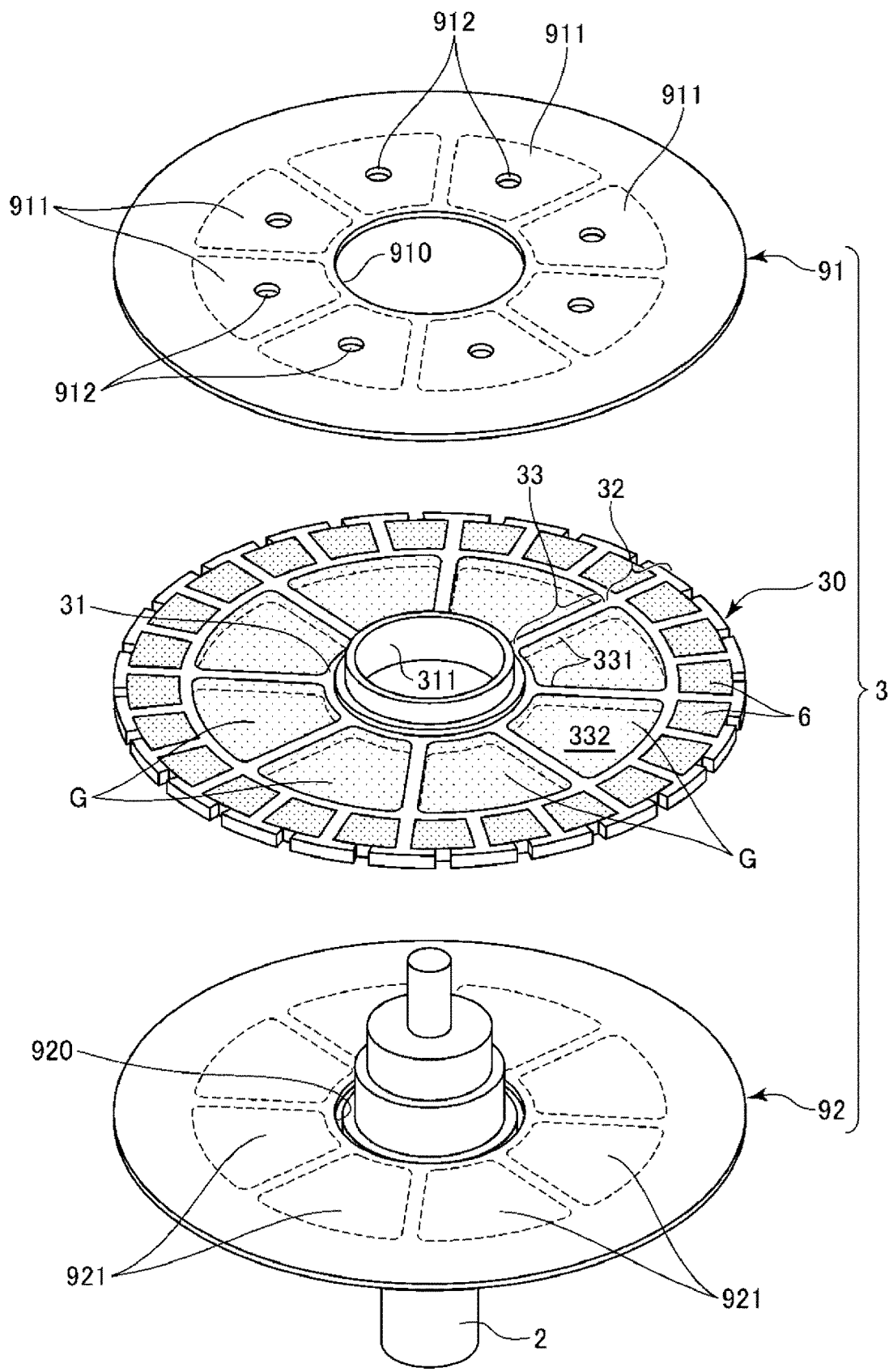
FIG. 2 is an exploded perspective view showing a rotor and a shaft shown in FIG. 1.
Figure 3:
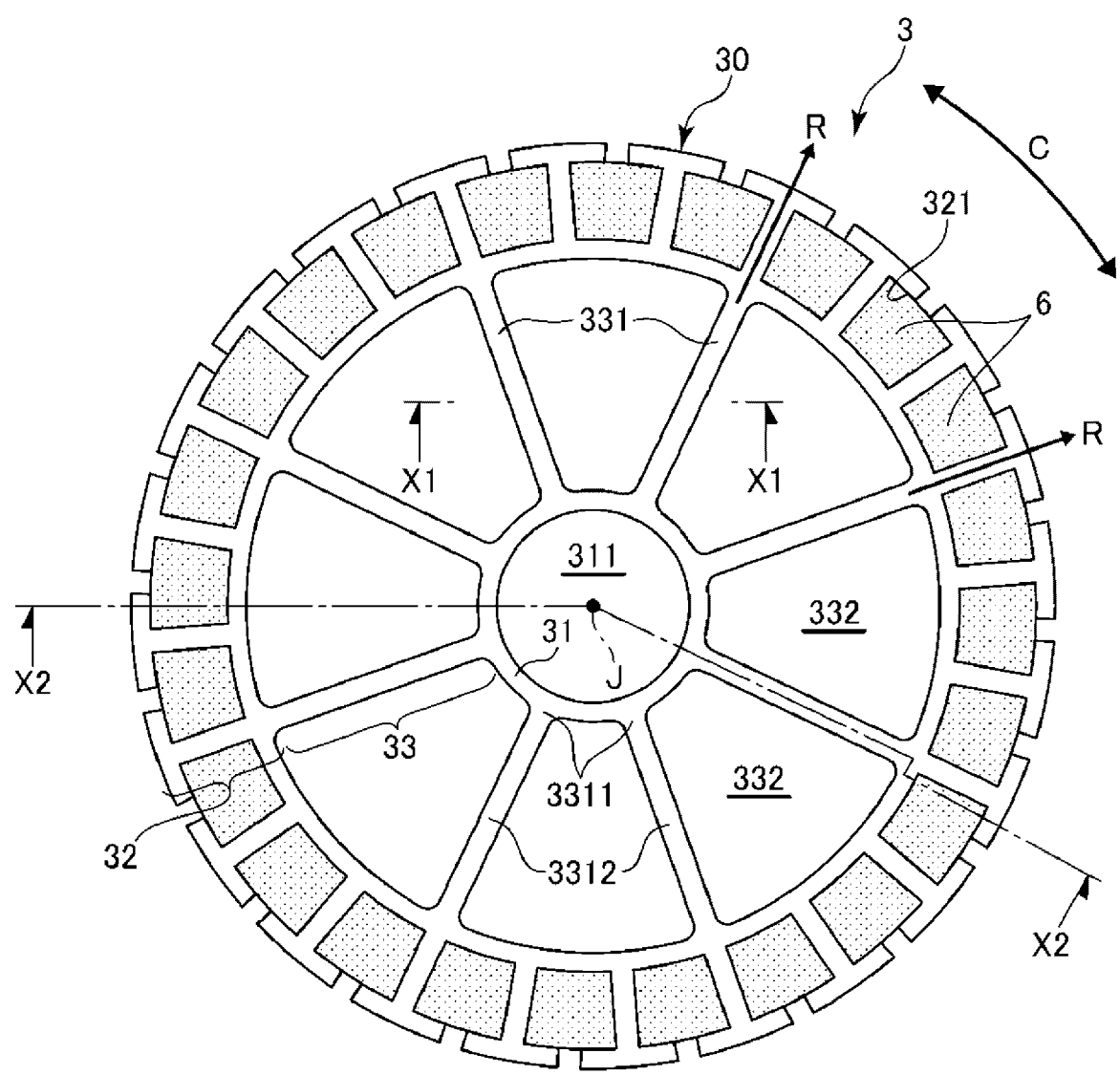
FIG. 3 is a plan view showing only a part of the rotor shown in FIG. 2.
Figure 4:
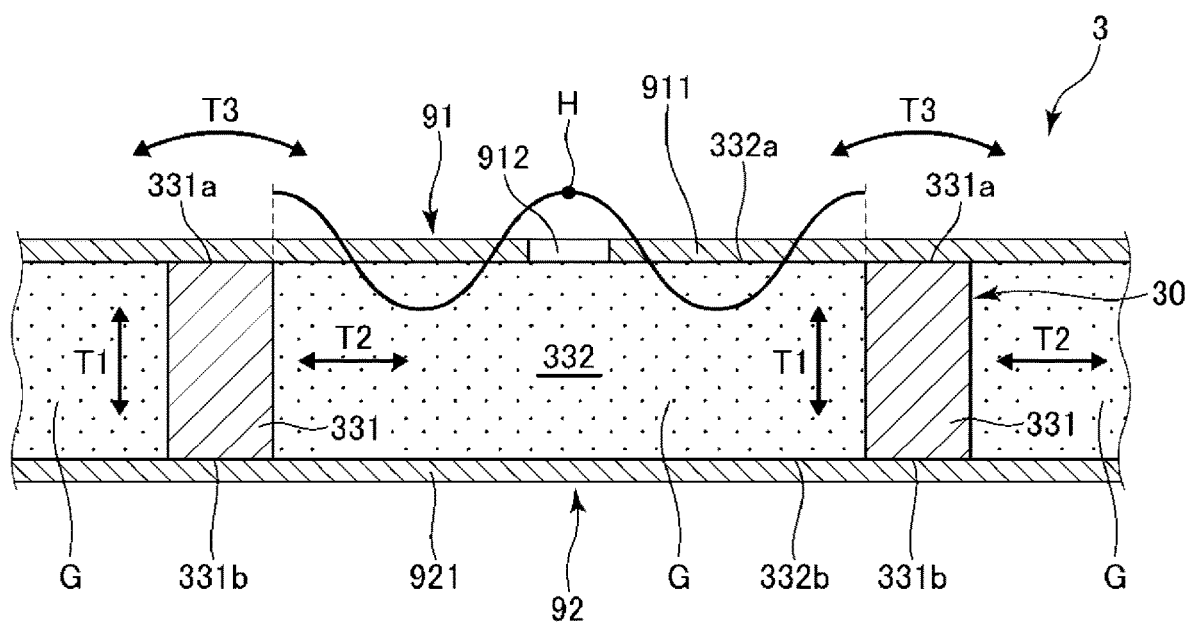
FIG. 4 is a X1-X1 line sectional view of FIG. 3.

FIG. 1 is a longitudinal sectional view showing an axial gap motor according to a first embodiment. FIG. 2 is an exploded perspective view showing a rotor and a shaft shown in FIG. 1. FIG. 3 is a plan view showing only a part of the rotor shown in FIG. 2. FIG. 4 is a X1-X1 line sectional view of FIG. 3. FIG. 1 is a X2-X2 line sectional view of FIG. 3.

An axial gap motor 1 shown in FIG. 1 adopts a double stator structure including a shaft 2 that rotates around a rotation axis J, a rotor 3 that is fixed to the shaft 2 and rotates around the rotation axis J together with the shaft 2, and a pair of stators 4 and 5 disposed on both sides in an axial direction A of the rotor 3 along the rotation axis J. Such an axial gap motor 1 rotates the rotor 3 and the shaft 2 centering on the rotation axis J and transmits rotating force to a driving target member coupled to the shaft 2. In this specification, for convenience of explanation, a direction along the rotation axis J is referred to as "axial direction A" as well, a direction orthogonal to the axial direction A is referred to as "radial direction R" as well, and a circumferential direction of the rotor 3 and the stators 4 and 5 is referred to as "circumferential direction C" as well. An arrow distal end side of the axial direction A is referred to "upper" as well and the opposite side of the arrow distal end side is referred to as "lower" as well. Further, plane view viewed from the upper side along the axial direction A is simply referred to as "plan view" as well. An arrow distal end side of the radial direction R is referred to as "outer" as well and an arrow proximal end side is referred to as "center" as well.

The shaft 2 has a substantially columnar shape, the outer diameter of which is partially different, and is solid. Consequently, the mechanical strength of the shaft 2 is improved. However, the shaft 2 may be hollow. In this case, a wire for axial gap motor 1 can be inserted through the inside of the shaft 2.

In the shaft 2, a disk-like rotor 3 is fixed concentrically with the shaft 2. The rotor 3 includes, as shown in FIGS. 1 to 3, a hub 31, which is located in the center of the rotor 3 and fixed to the shaft 2, an annular rim 32 located further on the outer side than the hub 31, that is, a side away from the rotation axis J, and a coupling section 33 coupling the hub 31 and the rim 32. A plurality of permanent magnets 6 are held in the rim 32. The rotor 3 is explained in detail below.

The stators 4 and 5 are attached to the shaft 2 via bearings 71 and 72. The shaft 2 and the rotor 3 are supported by the bearings 71 and 72 to be capable of rotating with respect to a motor case 10 configured by joining the stators 4 and 5 with a side surface case 8. In this embodiment, a radial ball bearing is used as the bearings 71 and 72. However, the bearings 71 and 72 are not limited to this. For example, various bearings such as an axial ball bearing, an angular ball bearing, and a taper roller bearing can be used.

As shown in FIG. 1, the stators 4 and 5 are disposed to sandwich the rotor 3 from the upper and lower sides. Specifically, the stator 4 is disposed on the lower side of the rotor 3 via a gap. The stator 5 is disposed on the upper side of the rotor 3 via a gap. The stators 4 and 5 are disposed vertically symmetrically with respect to the rotor 3.

The stator 4 includes an annular back yoke 41 disposed concentrically with the shaft 2, a plurality of stator cores 42 supported on the upper surface of the back yoke 41 and disposed to be opposed to the permanent magnets 6, and a plurality of coils 43 disposed in the stator cores 42. Similarly, the stator 5 includes an annular back yoke 51 disposed concentrically with the shaft 2, a plurality of stator cores 52 supported on the lower surface of the back yoke 51 and disposed to be opposed to the permanent magnet 6, and a plurality of coils 53 disposed in the stator cores 52. By disposing the pluralities of stator cores 42 and 52 in the stators 4 and 5 in this way, the rotation of the shaft 2 is smoother and the axial gap motor 1 has excellent driving efficiency.

The configuration of the stators 4 and 5 is explained in detail. Since the stators 4 and 5 have the same configuration, the stator 4 is representatively explained below. Explanation about the stator 5 is omitted.

The back yoke 41 is made of, for example, any one of various magnetic materials such as a laminated body of electromagnetic steel plates and a green compact of magnetic powder, in particular, a soft magnetic material. The back yoke 41 may be configured by an aggregate of a plurality of parts. The stator core 42 is disposed on the upper surface of such a back yoke 41. The stator 4 includes a plurality of stator cores 42. The plurality of stator cores 42 are arranged side by side at equal intervals along the circumferential direction C. The stator cores 42 are made of, for example, any one of various magnetic materials such as a laminated body of electromagnetic steel plates and a green compact of magnetic powder, in particular, a soft magnetic material. The stator cores 42 may be firmly fixed to the back yoke 41 by, for example, melting, an adhesive, or welding or may be engaged with the back yoke 41 by any one of various engaging means.

The coils 43 disposed in the stator cores 42 are wound on the outer circumference of the stator cores 42. Electromagnets are configured by the stator cores 42 and the coils 43. The coils 43 may be individually wound on the stator cores 42 or may be wound in a bobbin shape in advance and fit in the outer circumferences of the stator cores 42.

The axial gap motor 1 includes a not-shown energization circuit. The coils 43 are connected to the energization circuit. The coils 43 are energized at a predetermined cycle or in a predetermined pattern. When the coils 43 are energized by, for example, a three-phase alternating current, magnetic fluxes are generated from the electromagnets. Electromagnetic forces act on the permanent magnets 6 opposed to the electromagnets. This state is periodically repeated, whereby the rotor 3 rotates around the rotation axis J.

The stator 4 is explained above. The entire stator 4 may be molded by resin. By molding the stator 4 with the resin in this way, the back yoke 41 and the stator cores 42 can be fixed to each other. A more stable stator 4 can be obtained.

The configuration of the rotor 3 is explained in detail. The rotor 3 includes a rotor support 30 including the hub 31 located in the center of the rotor 3, the annular rim 32 located further on the outer side than the hub 31, and the coupling section 33 coupling the hub 31 and the rim 32.

The hub 31 includes, as shown in FIG. 1, a through-hole 311 that pierces through the hub 31 between an upper surface 311a and a lower surface 311b along the rotation axis J. The shaft 2 is fixed to the through-hole 311 by press-in or the like. Consequently, the shaft 2 and the rotor 3 are fixed. The length of the hub 31 along the rotation axis J, that is, the length in the axial direction A of the hub 31 is larger than the length in the axial direction A of the rim 32 and the coupling section 33. Consequently, a contact area of the hub 31 and the shaft 2 is secured wider to increase the strength of the fixing. However, a method of fixing the shaft 2 and the rotor 3 is not particularly limited. The shape and the like of the hub 31 are not limited to the above description.

As shown in FIG. 3, the rim 32 is formed in an annular shape having a center on the rotation axis J and includes a plurality of through-holes 321 provided at equal intervals along the circumferential direction C. The through-holes 321 pierce through the rim 32 between an upper surface 321a and a lower surface 321b of the rim 32 along the rotation axis J. The permanent magnets 6 are respectively inserted into the through-holes 321. The number of permanent magnets 6 is decided by the number of phases and the number of poles of the axial gap motor 1. For example, the number of permanent magnets 6 is twenty-four in this embodiment. Examples of the permanent magnets 6 include a neodymium magnet, a ferrite magnet, a samarium cobalt magnet, an alnico magnet, and a bond magnet. However, the permanent magnets 6 are not limited to these magnets.

The length of the permanent magnet 6 along the rotation axis J, that is, the thickness of the permanent magnet 6 is substantially equal to the length of the through-hole 321 along the rotation axis J, that is, the thickness of the through-hole 321. A plan view shape of the permanent magnet 6 is substantially equal to a plan view shape of the through-hole 321. Consequently, the permanent magnet 6 fills the through-hole 321 substantially without a gap. The upper surface of the permanent magnet 6 is aligned with the upper surface 321a of the rim 32. The lower surface of the permanent magnet 6 is aligned with the lower surface 321b of the rim 32.

The coupling section 33 includes, as shown in FIG. 3, a plurality of beams 331 extending along the radial direction R. The plurality of beams 331 radially extend along the radial direction R centering on the rotation axis J and are disposed at equal intervals along the circumferential direction C to couple the hub 31 and the rim 32. Accordingly, a void 332 is formed between a pair of beams 331 adjacent to each other. A plurality of voids 332 are disposed at equal intervals along the circumferential direction C. With such a configuration, it is possible to achieve a reduction in the weight of the rotor 3 without markedly spoiling the rigidity of the rotor 3. The void 332 is a "recess" in this embodiment and is configured by a through-hole including a first opening 332a opened on the upper surface of the coupling section 33 and a second opening 332b opened on the lower surface of the coupling section 33.

An extension pattern of the beams 331 is not limited to the radial shape. For example, the beams 331 may cross one another to form a lattice shape. The beams 331 may form a honeycomb structure such that a plan view shape of the voids 332 is formed in a polygonal shape such as a hexagonal shape.

The plan view shape of the beams 331 is not particularly limited. In FIG. 3, the beams 331 are formed in a linear shape. The beams 331 include a portion where the width of the beams 331 extending in the linear shape, that is, the length of the beams 331 in a direction (the circumferential direction C) orthogonal to both of the rotation axis J and a direction (the radial direction R) in which the beams 331 extend gradually changes. Specifically, the beams 331 include a first portion 3311 and a second portion 3312, widths of which are different from each other. The width of the first portion 3311 is large compared with the width of the second portion 3312. In such beams 331, as shown in FIG. 3, the first portion 3311 is provided in a coupling section to the hub 31. Consequently, even when stress concentrates on the coupling section, the beams 331 are much less easily deformed. Consequently, it is possible to more surely suppress occurrence of vibration and noise in the rotor 3. In the second portion 3312 where stress relatively less easily concentrates, it is possible to achieve a further reduction in the weight of the rotor 3 by reducing the width of the second portion 3312. A plan view shape of the beams 331 is not limited to the linear shape and may be any shape.

Examples of the constituent material of the rotor support 30 include metal materials such as stainless steel, aluminum or an alloy of aluminum, copper or an alloy of copper, nickel or an alloy of nickel, a magnesium alloy, and titanium or an alloy of titanium. It is preferable that the constituent material of the rotor support 30 is a nonmagnetic material. Consequently, the rotor support 30 less easily affects magnetic fluxes by the permanent magnet 6 and the coil 43. A problem such as a decrease in torque less easily occurs. Examples of a preferred nonmagnetic material include austenitic stainless steel.

The rotor 3 includes, as shown in FIGS. 1, 2, and 4, a reinforcing member 91 functioning as a first plate member provided on the upper side of the rotor support 30 and a reinforcing member 92 functioning as a second plate member provided on the lower side of the rotor support 30. That is, the rotor 3 has a configuration in which the rotor support 30 is sandwiched between two reinforcing members 91 and 92. The reinforcing members 91 and 92 are respectively plate-like members, a plan view shape of which is formed in an annular shape. The reinforcing member 91 includes a through-hole 910 in the center of the reinforcing member 91. Similarly, the reinforcing member 92 includes a through-hole 920 in the center of the reinforcing member 92. The hub 31 of the rotor support 30 is inserted into the through-holes 910 and 920.

The reinforcing member 91 is joined to the upper surface of the coupling section 33, that is, upper surfaces 331*a* of the beams 331 via a not-shown adhesive and connects the beams 331. Further, the reinforcing member 91 is also joined to the upper surface 321*a* of the rim 32 and the upper surfaces of the permanent magnets 6 via the adhesive. Similarly, the reinforcing member 92 is joined to the lower surface of the coupling section 33, that is, lower surfaces 331*b* of the beams 331 via a not-shown adhesive and connects the beams 331. Further, the reinforcing member 92 is also joined to the lower surface 321*b* of the rim 32 and the lower surfaces of the permanent magnets 6 via the adhesive.

With such a configuration, the plurality of beams 331 can be integrated by the reinforcing members 91 and 92. Accordingly, it is possible to sufficiently reinforce the coupling section 33 even in a state in which voids 332 are provided among the beams 331. As a result, it is possible to suppress deformation of the coupling section 33 including the beams 331, which are easily deformed, and suppress occurrence of vibration and noise due to the deformation of the rotor support 30. Further, when the coupling section 33 includes the beams 331, a windage loss easily occurs according to the rotation of the rotor 3. However, since the coupling section 33 is covered by the reinforcing members 91 and 92, such a windage loss can be reduced.

In this embodiment, the reinforcing members 91 and 92 are respectively fixed to the rotor support 30 by the adhesives. However, a method of fixing the reinforcing members 91 and 92 is not particularly limited. Examples of the fixing method include a method of fixing the reinforcing members 91 and 92 using joining metal and welding.

By providing such reinforcing members 91 and 92, the rotor support 30 is reinforced and it is possible to suppress occurrence of bending deformation and torsional deformation. Examples of the bending deformation include bending deformation along the axial direction A indicated by an arrow T1 in FIG. 4 and bending deformation along the circumferential direction C indicated by an arrow T2 in FIG. 4. Examples of the torsional deformation include torsional deformation around an axis extending in the radial direction R indicated by an arrow T3 in FIG. 4. By providing the reinforcing members 91 and 92, it is possible to suppress these deformations.

In the axial gap motor 1, large torque is generated by interaction of the permanent magnets 6 and the stators 4 and 5. The torque sometimes periodically fluctuates. In that case, vibration occurs in the rotor 3 and noise occurs according to the occurrence of the vibration. In contrast, by providing the reinforcing members 91 and 92, it is possible to suppress deformation of the rotor support 30. Since the deformation of the rotor support 30 is suppressed, it is possible to suppress vibration and noise that occur during the rotation of the rotor 3.

The constituent material of the reinforcing members 91 and 92 is not particularly limited. However, a material having a Young's modulus higher than the Young's modulus of the constituent material of the rotor support 30 is preferably used. By using such a material, it is possible to, while achieving a reduction in the weight of the rotor 3, suppress deterioration in mechanical strength involved in the reduction in the weight. As a result, it is possible to realize the rotor 3 in which both of the reduction in the weight and low deformation properties are achieved. Examples of such a constituent material include the various metal materials included in the examples of the constituent material of the rotor support 30, a ceramics material, a carbon fiber, a glass fiber, and a resin material and include a composite material of two or more kinds of these materials.

It is preferable that the reinforcing members 91 and 92 include an electromagnetic steel plate. Since the electromagnetic steel plate has a relatively high Young's modulus, even when the rigidity of the rotor support 30 is low, rigidity can be imparted to the rotor support 30. Consequently, it is possible to particularly suppress deformation of the rotor support 30. Further, the electromagnetic steel plate is a soft magnetic material. Accordingly, it is possible to reduce fluctuation in torque, in particular, cogging torque that occurs because N-pole magnets and S-pole magnets are alternately arranged side by side along the circumferential direction C and suppress occurrence of vibration of the rotor 3 and noise involved in the vibration.

The reinforcing members 91 and 92 may include a magnetic material other than the electromagnetic steel plate. The same effects as the effects described above are obtained in this case. Examples of the magnetic material other than the electromagnetic steel plate include soft magnetic materials such as amorphous metal, permalloy, Sendust, Permedur, and pure iron.

Average thickness of the reinforcing members 91 and 92 is not particularly limited. However, the average thickness is preferably 0.10 mm or more and 1.50 mm or less and more preferably 0.20 mm or more and 1.00 mm or less. By setting the reinforcing members 91 and 92 to such thickness, it is possible to impart a sufficient reinforcement effect to the rotor support 30 while suppressing an increase in the thickness of the rotor 3. Accordingly, it is possible to realize the rotor 3 with less vibration and noise while avoiding an increase in the weight and an increase in the size of the rotor 3.

As shown in FIGS. 1, 2, and 4, the reinforcing member 91 includes a lid section 911 that overlaps the voids 332 in plan view from the axial direction A and covers the first openings 332*a*, which are upper openings of the voids 332. Similarly, the reinforcing member 92 includes a lid section 921 that overlaps the voids 332 in the plan view from the axial direction A and covers the second openings 332*b*. The lid sections 911 and 921 are respectively portions not joined to the rotor support 30. Accordingly, the lid sections 911 and 921 are easily deflectively vibrated in the thickness direction by vibration that occurs in the rotor 3 and an electromagnetic force acting on the reinforcing members 91 and 92 from the coil 43. A compressional wave due to expansion/compression of gas (air) present around the lid sections 911 and 921 occurs with such vibration. Noise is caused by the compressional wave.

Therefore, the rotor 3 in this embodiment is devised to suppress the deflective vibration of the lid sections 911 and 921 to suppress occurrence of noise due to the deflective vibration. This is explained in detail below. First through-holes 912 that cause the inside and the outside of the voids 332 to communicate are formed in the lid sections 911 included in the reinforcing member 91. Accordingly, it is possible to supply gas from the outside of the voids 332 to the inside of the voids 332 and discharge the gas from the inside of the voids 332 to the outside of the voids 332 via the first through-holes 912. Therefore, compression/expansion of gas in the voids 332 due to the deflective vibration of the lid sections 911 and 921 is suppressed. It is possible to effectively suppress occurrence of a compressional wave. Consequently, it is possible to effectively suppress the occurrence of noise due to the vibration of the lid sections 911 and 921.

The diameter of the first through-holes 912 is not particularly limited. However, it is preferable that the diameter is as small as possible as long as it is possible to cause gas to sufficiently flow between the inside and the outside of the voids 332. For example, it is preferable that the diameter of the first through-holes 912 is approximately 1 mm or more and 5 mm or less. Consequently, it is possible to effectively suppress deterioration in the rigidity of the reinforcing member 91 due to the formation of the first through-holes 912. It is possible to reduce deviation of a weight balance between the reinforcing member 91 in which the first through-holes 912 are formed and the reinforcing member 92 in which such through-holes are not formed.

In the plan view from the axial direction A, the first through-holes 912 overlap the centers of the voids 332. The centers of the voids 332 are positions of the centers of gravity in the plan view of the voids 332 and are positions separated from the hub 31, the rim 32, and the beams 331. Accordingly, the centers of the voids 332 are parts where the vibration amplitude of the lid sections 911 and 921 easily increases. Accordingly, compression/expansion of gas easily occurs and strength of the compression/expansion (a compression ratio/an expansion ratio) also easily increases.

Therefore, by forming the first through-holes 912 in the parts, compression/expansion of gas in the voids 332 is effectively suppressed. It is possible to more effectively suppress occurrence of a compressional wave. As a result, it is possible to more effectively suppress the occurrence of noise due to the vibration of the lid sections 911 and 921.

As shown in FIG. 4, the first through-hole 912 overlaps a loop H of vibration that occurs in the lid section 911. The loop H means a portion where amplitude is maximized. By providing the first through-hole 912 in such a portion, it is possible to effectively attenuate the vibration of the lid section 911. Accordingly, it is possible to more effectively suppress the occurrence of noise due to the deflective vibration of the lid sections 911 and 921.

As shown in FIGS. 1, 2, and 4, a filler G functioning as a member is disposed in spaces formed by covering the insides of the voids 332, specifically, covering the first openings 332*a* of the voids 332 with the reinforcing member 91 and covering the second openings 332*b* with the reinforcing member 92. By disposing the filler G in the spaces in this way, the lid sections 911 and 921 less easily vibrate. It is possible to effectively suppress occurrence of noise due to the vibration of the lid sections 911 and 921.

The filler G is in contact with the inner surfaces of the lid sections 911 and 921. Consequently, vibration of the lid sections 911 and 921 less easily occurs. Further, even if vibration occurs, the vibration is attenuated by the filler G. Accordingly, it is possible to effectively suppress the occurrence of noise due to the vibration of the lid sections 911 and 921. In particular, in this embodiment, the filler G is disposed to fill the entire spaces. That is, the spaces are filled by the filler G without a gap. The filler G is in contact with the entire regions of the inner surfaces of the lid sections 911 and 921. Consequently, the lid sections 911 and 921 much less easily vibrate. It is possible to more effectively suppress the occurrence of noise due to the vibration of the lid sections 911 and 921.

The filler G is joined to the inner surfaces of the lid sections 911 and 921. Consequently, the lid sections 911 and 921 are coupled via the filler G and flexibility of vibration decreases. Accordingly, the vibration of the lid sections 911 and 921 still much less easily occurs. It is possible to still more effectively suppress the occurrence of noise due to the vibration of the lid sections 911 and 921.

The density ($g/cm^3$) of such a filler G is lower than the density of the coupling section 33. That is, the weight per unit volume of the filler G is smaller than the weight per unit volume of the coupling section 33. The density of the filler G means the density of the filler G in a hardened state. Consequently, it is possible to suppress an increase in the weight of the rotor 3 due to filling of the filler G. It is possible to at least prevent the rotor 3 from becoming heavier than the coupling section 33 in which the voids 332 are not formed. Such a filler G is not particularly limited. However, it is preferable that the filler G is any one of various resin mold materials, any one of various resin materials such as resin foam (formed resin), or any one of various rubber materials such as rubber (elastomer) and a foamed rubber material. Consequently, the filler G having sufficiently low density is easily obtained. The filler G, as long as the density of which is lower than the density of the coupling section 33, may be a material other than the resin material, for example, any one of various metal materials, any one of ceramic materials, a porous ceramic material, any one of various glass materials, a honeycomb structure, nonwoven fabric, a solid of powder, a semisolid, or a paste-like object.

It is preferable that the filler G is silicone rubber. Consequently, the filler G that is easily treated and inexpensive is obtained. Further, it is preferable that the filler G is silicone foam (foamed silicone) among various kinds of silicone rubber. Consequently, it is possible to further reduce the density of the filler G and reduce an increase in the weight of the rotor 3 due to filling of the filler G. It is possible to cause sound (a compressional wave), which occurs because of the vibration of the lid sections 911 and 921, to interfere in a large number of micropores present in the filler G and attenuate the sound (the compressional wave). Accordingly, it is possible to more effectively suppress the occurrence of noise due to the vibration of the lid sections 911 and 921.

In particular, if liquid silicone of a self-foaming type is used, it is possible to harden the filler G in approximately ten minutes in the room temperature and exert excellent workability. It is possible to exert sufficient heat resistance to approximately 200° C. It is possible to easily select an expansion ratio in a range of approximately two to fifteen times. The expansion ratio can be easily adjusted to an expansion ratio suitable for attenuating sound caused by the vibration of the lid sections 911 and 921. In this case, it is possible to supply the liquid silicone of the self-foaming type into the voids 332 via the first through-holes 912 formed in the lid section 911. That is, the first through-holes 912 can be used as supply ports for supplying the liquid silicone of the self-foaming type. Accordingly, it is easy to dispose the filler G in the voids 332. It is possible to fill the filler G in the voids 332 without a gap.

However, the filler G is not particularly limited. Examples of other preferred materials include various rubber materials such as natural rubber, isoprene rubber, butadiene rubber, styrene-butadiene rubber, nitrile rubber, chloroprene rubber, butyl rubber, acrylic rubber, ethylene-propylene rubber, hydrin rubber, urethane rubber, and fluorocarbon rubber and various thermoplastic elastomers such as styrene-based, polyolefin-based, polyvinyl chloride-based, polyurethane-based, polyester-based, polyamide-based, polybutadiene-based, trans-polyisoprene-based, fluorocarbon rubber-based, and chlorinated polyethylene-based. Two or more kinds of the materials can be mixed and used. As the filler G, foamed bodies such as polyurethane, phenolic resin, urea resin, epoxy resin, and acrylic resin can be also be used. When a foamed body is used as the filler G, the foamed body may be either independent bubbles or continuous bubbles or may be either soft or hard.

A method of filling the filler G is not particularly limited. That is, rather than supplying the liquid silicone of the self-foaming type into the voids 332 via the first through-holes 912 as in this embodiment, the filler G molded into the same shape as the voids 332 in advance may be inserted into the voids 332.

The axial gap motor 1 is explained above. Such an axial gap motor 1 includes, as explained above, the rotor 3 that rotates around the rotation axis J and the stators 4 and 5 disposed to be opposed to the rotor 3 across the gap in the axial direction A parallel to the rotation axis J. The rotor 3 includes the hub 31, the annular rim 32 located on the outer side (the outer circumference side) of the hub 31 and holding the permanent magnets 6, the coupling, section 33 coupling the hub 31 and the rim. 32 and including the voids 332 functioning as the recesses including the first openings 332a opened on the surface facing the upper side, which is one end side, in the axial direction A, the reinforcing member 91 functioning as the first plate member disposed on the upper side of the coupling section 33 and covering at least a part of, in this embodiment, the entire first openings 332a in the plan view from the axial direction A, and the filler G, which is the member disposed in the voids 332 and having density lower than the density of the coupling section 33. With such a configuration, it is possible to reinforce the coupling section 33 with the reinforcing member 91. Accordingly, it is possible to suppress deformation of the coupling section 33, which includes the voids 332 and is easily deformed, and suppress occurrence of vibration and noise. Further, since the voids 332 are covered by the reinforcing member 91, it is also possible to reduce a windage loss. Since the filler G is disposed in the voids 332, it is possible to effectively suppress occurrence of vibration of the reinforcing member 91 and noise due to such vibration.

As explained above, the filler G is in contact with the reinforcing member 91. Consequently, it is possible to attenuate the vibration of the reinforcing member 91 with the filler G. Accordingly, it is possible to effectively suppress occurrence of the vibration of the reinforcing member 91 and the noise due to such vibration.

As explained above, the filler G is filled in the voids 332. Consequently, it is possible to more effectively attenuate the vibration of the reinforcing member 91 with the filler G. Accordingly, it is possible to more effectively suppress occurrence of the vibration of the reinforcing member 91 and the noise due to such vibration.

As explained above, the reinforcing member 91 includes the first through-holes 912 that cause the inside and the outside of the voids 332 to communicate. With such a configuration, it is possible to supply gas from the outside of the voids 332 to the inside of the voids 332 and discharge the gas from the inside of the voids 332 to the outside of the voids 332 via the first through-holes 912. Accordingly, compression/expansion of the gas in the voids 332 due to deflective vibration of the reinforcing member 91 is suppressed. It is possible to effectively suppress occurrence of a compressional wave. Accordingly, it is possible to effectively suppress noise due to the vibration of the reinforcing member 91.

As explained above, in the plan view from the axial direction A, the first through-holes 912 overlap the centers of the voids 332. The centers are the parts where amplitude of the reinforcing member 91 is maximized. Therefore, by disposing the first through-holes 912 in the parts, it is possible to more effectively supply gas from the outside of the voids 332 to the inside of the voids 332 and discharge the gas from the inside of the voids 332 to the outside of the voids 332. Accordingly, it is possible to more effectively suppress noise due to the vibration of the reinforcing member 91.

As explained above, the first through-hole 912 overlaps the loop of the vibration that occurs in the reinforcing member 91. Consequently, it is possible to effectively attenuate the vibration of the reinforcing member 91. Accordingly, it is possible to more effectively suppress noise due to the vibration of the reinforcing member 91.

As explained above, the plurality of voids 332 are disposed along the circumferential direction C of the coupling section 33. Consequently, it is possible to reduce the coupling section 33 in weight.

As explained above, the voids 332 include the second openings 332b opened on the surface facing the lower side, which is the other end side in the axial direction A of the coupling section 33. The rotor 3 includes the reinforcing member 92 functioning as the second plate member disposed on the lower side of the coupling section 33 and covering at least a part of, in this embodiment, the entire second openings 332b in the plan view from the axial direction A. By forming the voids 332 as the through-holes and disposing the reinforcing member 92 in this way, it is possible to achieve a further reduction in the weight of the coupling section 33 while keeping the rigidity of the coupling section 33.

As explained above, the filler G is the resin material. Consequently, the filler G having sufficiently low density is obtained. Further, as explained above, the filler G is the silicone rubber. Consequently, the filler G that is easily treated and inexpensive is obtained.

As explained above, the filler G is the foamed body. Consequently, it is possible to further reduce the density of the filler G and reduce an increase in the weight of the rotor 3 due to the filling of the filler G. It is possible to cause sound, which occurs because of the vibration of the reinforcing members 91 and 92, to interfere in a large number of micropores present in the filler G and attenuate the sound. Accordingly, it is possible to still more effectively suppress the occurrence of noise due to the vibration of the reinforcing members 91 and 92.

Second Embodiment

Figure 5:
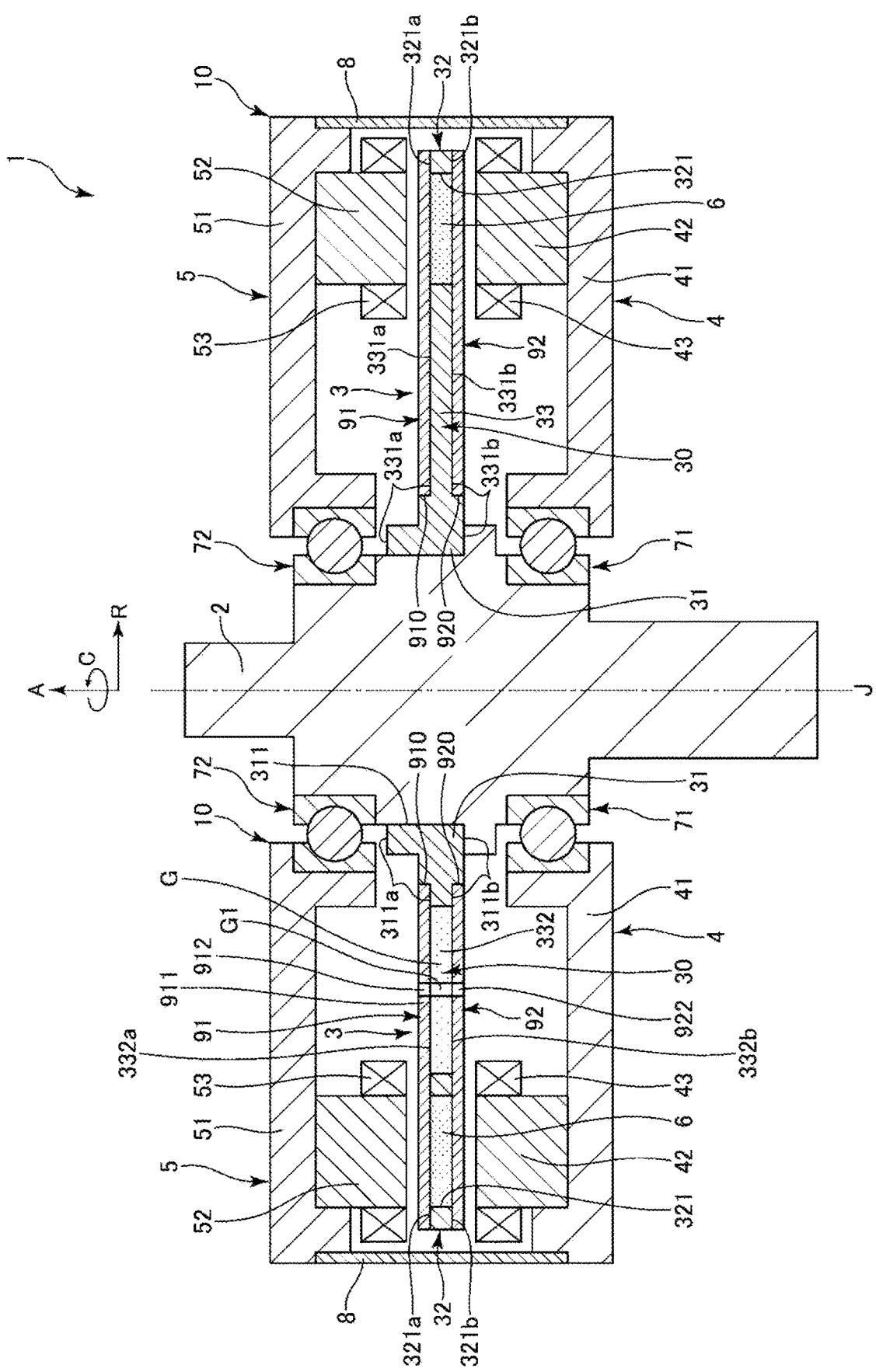
FIG. 5 is a longitudinal sectional view showing an axial gap motor according to a second embodiment.
Figure 6:
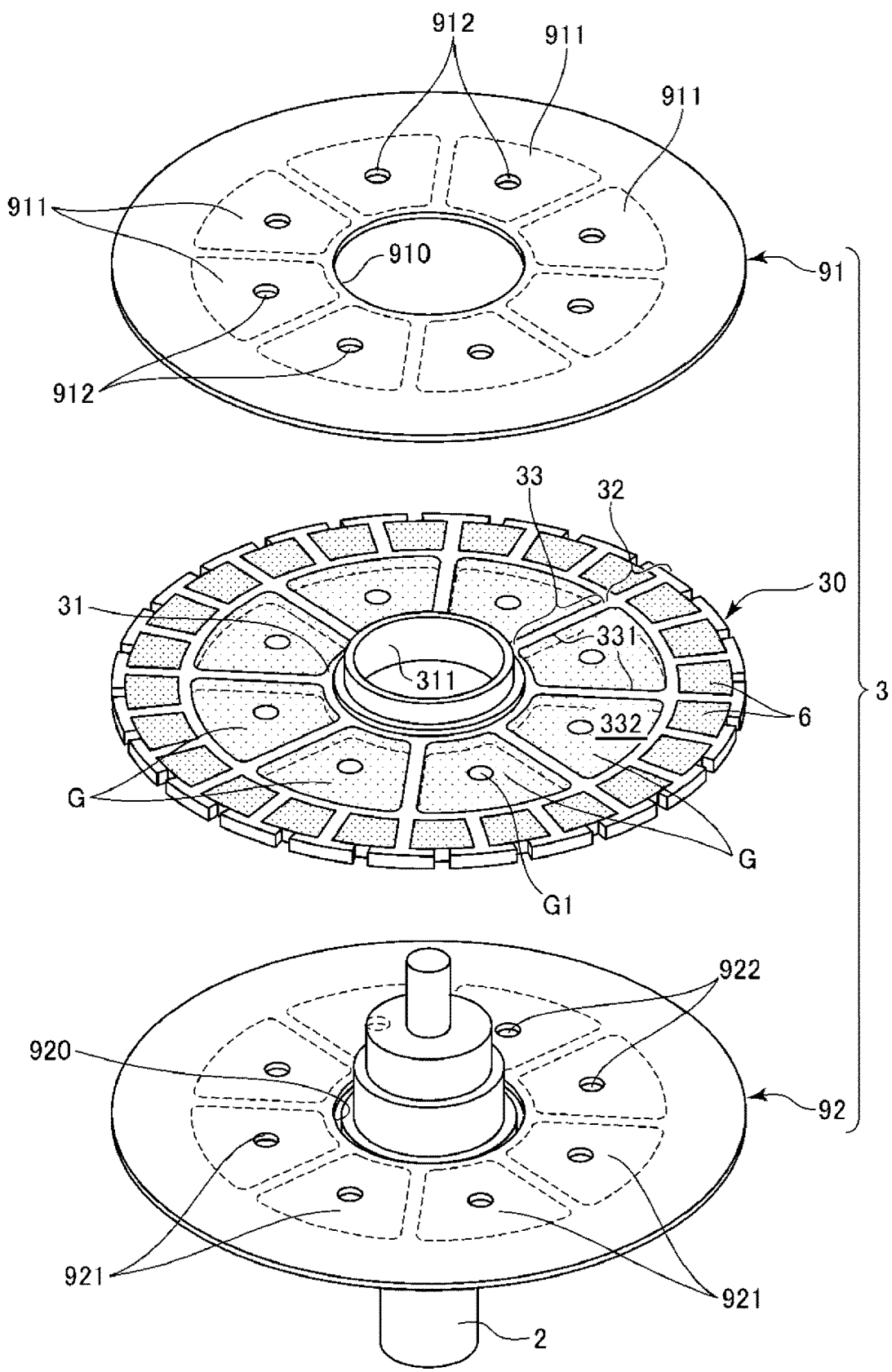
FIG. 6 is an exploded perspective view showing a rotor and a shaft shown in FIG. 5.

FIG. 5 is a longitudinal sectional view showing an axial gap motor according to a second embodiment. FIG. 6 is an exploded perspective view showing a rotor and a shaft shown in FIG. 5.

This embodiment is the same as the first embodiment explained above except that the configuration of the filler G is different. In the following explanation, concerning this embodiment, differences from the first embodiment are mainly explained. Explanation about similarities to the first embodiment is omitted. In FIGS. 5 and 6, the same components as the components in the first embodiment are denoted by the same reference numerals and signs.

As shown in FIGS. 5 and 6, in the axial gap motor 1 in this embodiment, second through-holes 922 that cause the inside and the outside of the voids 332 to communicate are formed in the lid sections 921 included in the reinforcing member 92. Accordingly, via the first and second through-holes 912 and 922, it is possible to supply gas from the outside of the voids 332 to the inside of the voids 332 and discharge the gas from the inside of the voids 332 to the outside of the voids 332. Accordingly, compression/expansion of the gas in the voids 332 due to deflective vibration of the lid sections 911 and 921 is more effectively suppressed. Therefore, it is possible to effectively suppress the occurrence of noise due to the vibration of the lid sections 911 and 921.

In the plan view from the axial direction A, the second through-holes 922 overlap the centers of the voids 332. The centers of the voids 332 are parts where the vibration amplitude of the lid sections 911 and 921 easily increases. Accordingly, compression/expansion of gas easily occurs and strength (a compression ratio/an expansion ratio) also easily increases. Therefore, by forming the second through-holes 922 in the parts, compression/expansion of gas in the voids 332 is effectively suppressed. It is possible to more effectively suppress occurrence of a compressional wave. As a result, it is possible to more effectively suppress the occurrence of noise due to the vibration of the lid sections 911 and 921.

Although not shown in FIGS. 5 and 6, the second through-hole 922 overlaps a loop of vibration that occurs in the lid section 921. By providing the second through-hole 922 in such a place, it is possible to effectively attenuate the vibration of the lid section 921. Accordingly, it is possible to still more effectively suppress the occurrence of noise due to the deflective vibration of the lid sections 911 and 921.

The first through-hole 912 and the second through-hole 922 formed in the same void 332 are disposed side by side in the axial direction A. In the filler G filled in the void 332, a through-hole G1 piercing through the filler G between the upper surface and the lower surface of the filler G is formed. The first through-hole 912 and the second through-hole 922 communicate via the through-hole G1. With such a configuration, for example, compared with the first embodiment in which the first and second through-holes 912 and 922 are closed by the filler G, the gas is more smoothly supplied from the outside of the voids 332 to the inside of the voids 332 and more smoothly discharged from the inside of the voids 332 to the outside of the voids 332. Accordingly, it is possible to more effectively suppress the occurrence of noise due to the vibration of the reinforcing members 91 and 92.

As explained above, in the axial gap motor 1 in this embodiment, the reinforcing member 91 includes the first through-holes 912 that cause the inside and the outside of the voids 332 to communicate and the reinforcing member 92 includes the second through-holes 922 that cause the inside and the outside of the voids 332 to communicate. The filler G includes the through-hole G1 that causes the first through-holes 912 and the second through-holes 922 to communicate. With such a configuration, the gas is more smoothly supplied from the outside of the voids 332 to the inside of the voids 332 and more smoothly discharged from the inside of the voids 332 to the outside of the voids 332. Accordingly, compression/expansion of the gas in the voids 332 due to the deflective vibration of the reinforcing members 91 and 92 is suppressed. It is possible to effectively suppress occurrence of a compressional wave. Therefore, it is possible to effectively suppress noise due to the vibration of the reinforcing members 91 and 92.

According to such a second embodiment, the same effects as the effects in the first embodiment can be exerted.

Third Embodiment

Figure 7:
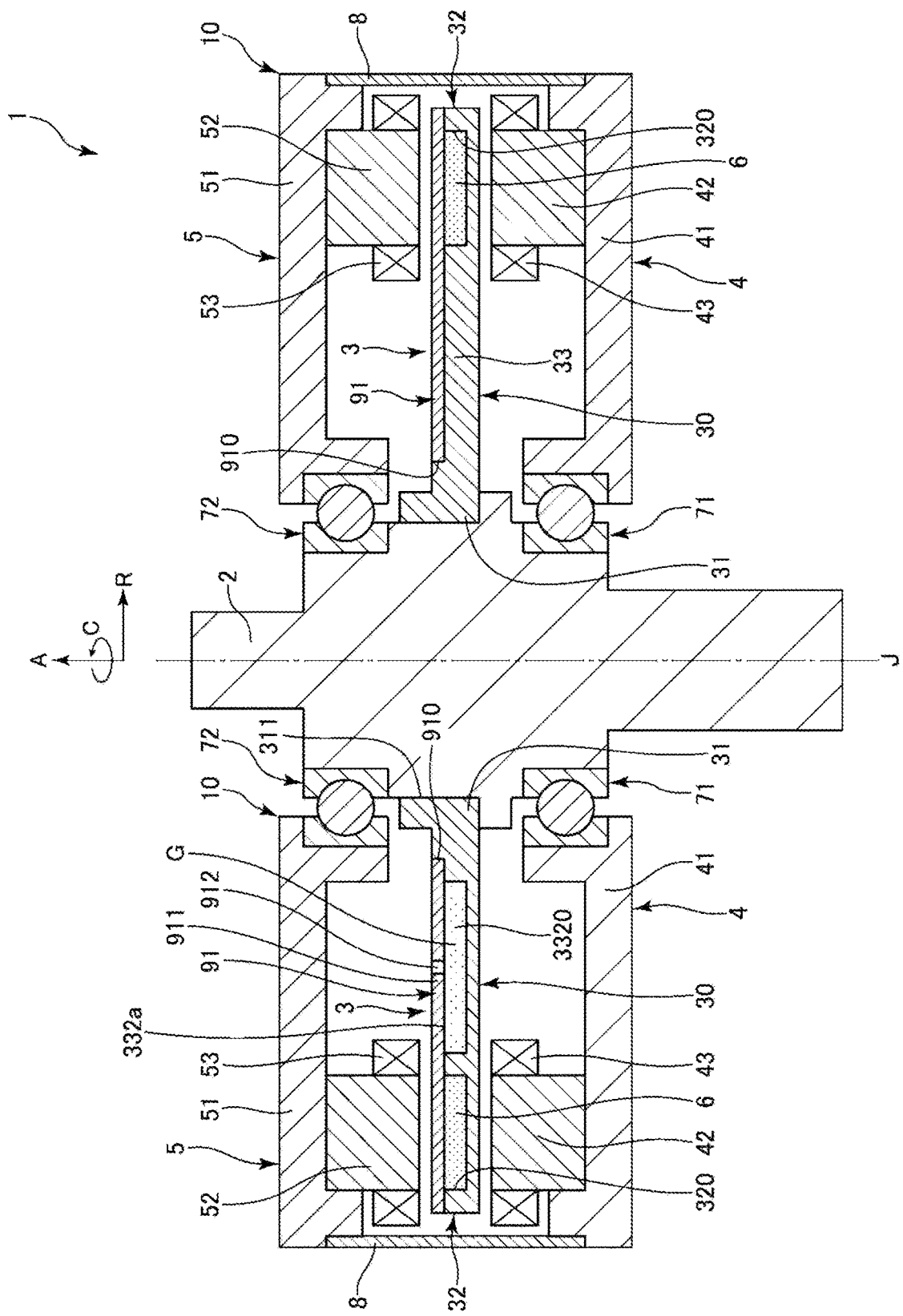
FIG. 7 is a longitudinal sectional view showing an axial gap motor according to a third embodiment.

FIG. 7 is a longitudinal sectional view showing an axial gap motor according to a third embodiment.

This embodiment is the same as the first embodiment explained above except that the configuration of the rotor 3 is different. In the following explanation, concerning this embodiment, differences from the first embodiment are mainly explained. Explanation about similarities to the first embodiment is omitted. In FIG. 7, the same components as the components in the first embodiment are denoted by the same reference numerals and signs.

As shown in FIG. 7, in the axial gap motor 1 in this embodiment, the reinforcing member 92 is removed from the rotor 3. In the coupling section 33, the void 332 is configured by a bottomed recess 3320 including the first opening 332a opened on the upper surface of the coupling section 33. In the rim 32, instead of the through-hole 321, a bottomed recess 320 opened on the upper surface of the rim 32 is formed. The permanent magnet 6 is held in the recess 320.

According to such a third embodiment, the same effects as the effects in the first embodiment can be exerted.

The axial gap motor of the present disclosure is explained above based on the embodiments shown in the figures. However, the present disclosure is not limited to this. The components of the sections can be replaced with any components having the same functions. Any other components may be added to the present disclosure. The modification and the embodiments explained above may be combined as appropriate. It is also possible to adopt a form in which the shaft is fixed, the disposition of the rotor and the stator is reversed, and the rotor rotates around the shaft.

In the embodiments explained above, the lid section 911 covers the entire region of the first opening 332a of the void 332. However, not only this, but the lid section 911 only has to cover at least a part of the first opening 332a. For example, the lid section 911 may cover substantially a half on the hub 31 side of the void 332, in other words, substantially a half on the inner circumference side or may cover substantially a half on the rim 32 side of the void 332, in other words, substantially a half on the outer circumference side. The same applies to the lid section 921. In the embodiments, the pair of stators 4 and 5 are provided. However, not only this, but one of the stators 4 and 5 may be omitted. Without being limited to the embodiments, the filler G can also be referred to as member G. The filler G may be present in a part of the void 332 even if the filler G does not completely fill the void 332.

What is claimed is:

1. An axial gap motor comprising:
   a rotor configured to rotate around a rotation axis; and
   a stator disposed to be opposed to the rotor across a gap in an axial direction parallel to the rotation axis, wherein
   the rotor includes:
   a hub;
   an annular rim located on an outer side of the hub and holding a permanent magnet;
   a coupling section coupling the hub and the rim and including a recess having a first opening opened on a surface facing one end side in the axial direction;
   a first plate member disposed on the one end side of the coupling section and covering at least a part of the first opening in plane view from the axial direction; and
   a member disposed in the recess and having density lower than density of the coupling section,
   wherein the first plate member includes a first through-hole that causes an inside and an outside of the recess to communicate,
   wherein the recess includes a second opening opened on a surface facing another end side in the axial direction of the coupling section,
   the rotor includes a second plate member disposed on the other end side of the coupling section and covering at least a part of the second opening in the plane view from the axial direction,
   the second plate member includes a second through-hole that causes the inside and the outside of the recess to communicate, and
   the member includes a through hole that causes the first through-hole and the second through-hole to communicate,
   wherein the member is in contact with the first plate member.

2. The axial gap motor according to claim 1, wherein the member is filled in the recess.

3. The axial gap motor according to claim 1, wherein, in the plane view from the axial direction, the first through-hole overlaps a center of the recess.

4. The axial gap motor according to claim 1, wherein the first through-hole overlaps a loop of vibration that occurs in the first plate member.

5. The axial gap motor according to claim 1, wherein a plurality of the recesses are disposed along a circumferential direction of the coupling section.

6. The axial gap motor according to claim 1, wherein the member is a resin material.

7. The axial gap motor according to claim 6, wherein the member is silicone rubber.

8. The axial gap motor according to claim 6, wherein the member is a foamed body.

* * * * *